United States Patent [19]

Kadomukai et al.

[11] Patent Number: 5,033,425
[45] Date of Patent: Jul. 23, 1991

[54] INTERNAL COMBUSTION ENGINE EQUIPPED WITH A TORQUE CONTROLLER

[75] Inventors: Yuzo Kadomukai; Yozo Nakamura; Mitsuru Nakamura, all of Ibaraki; Naoki Tanaka, Abiko, all of Japan

[73] Assignee: Hitachi, Ltd., Tokyo, Japan

[21] Appl. No.: 445,164

[22] Filed: Dec. 6, 1989

Related U.S. Application Data

[63] Continuation of Ser. No. 158,743, Feb. 22, 1988, abandoned.

[30] Foreign Application Priority Data

Feb. 27, 1987 [JP] Japan ................................ 62-42653

[51] Int. Cl.$^5$ ............................................. F02B 75/06
[52] U.S. Cl. ...................................... 123/192 R; 123/2
[58] Field of Search ........... 123/1 R, 2, 192 R, 192 B, 123/436; 290/51

[56] References Cited

U.S. PATENT DOCUMENTS 4,539,956  9/1985  Hengel et al. ................. 123/436 X
4,699,097 10/1987  Tanaka et al. ................. 123/192 R

FOREIGN PATENT DOCUMENTS 126434   7/1983  Japan ..................................... 123/2
211542  12/1983  Japan .
 37241   2/1984  Japan ..................................... 123/2

Primary Examiner—Noah P. Kamen
Attorney, Agent, or Firm—Antonelli, Terry, Stout & Kraus

[57] ABSTRACT

To substantially prevent vibrations from arising due to a torque fluctuation of an internal combustion engine, a torque fluctuation of the internal combustion engine is detected, and a torque to be absorbed or generated by a motor generator is controlled so as to decrease the fluctuation torque according to a fluctuation torque information of at least one previous engine cycle.

5 Claims, 6 Drawing Sheets

FIG. 8

INTERNAL COMBUSTION ENGINE EQUIPPED WITH A TORQUE CONTROLLER

This is a continuation of application Ser. No. 158,743, filed Feb. 22, 1988, abandoned.

BACKGROUND OF THE INVENTION

1. Field of the Invention

The present invention relates to an internal combustion engine, and more particularly to a torque controller for internal combustion engines for preferably decreasing a torque fluctuation arising from combustion pressure variations and a cylinder block vibration induced by the torque fluctuation.

2. Description of the Prior Art

In internal combustion engines, it has been known that "gas torque" fluctuates according to the varying cylinder internal pressures due to suction and compression of intake mixture gas, expansion of combustion gas and the varying connecting rod angle with the crankshaft, and that "inertia torque" fluctuates according to the rotational inertia force variation. If such torque fluctuation is transferred to various components of accessory driven by the internal combustion engine, torsional vibration may arise in those components and deteriorate engine performance or damage the components; therefore, the torque fluctuation of the internal combustion engine must be reduced sufficiently. Then, a reaction of the torque fluctuation is transferred from a cylinder block to an engine support member, vibrates the member and noise increases, therefore such vibration must likewise be reduced.

To solve the problems, it has been proposed in, for example, Japanese Patent Laid-Open Number 185938/1983, to suppress a rotational torque fluctuation by generating a counter load torque on a crank shaft synchronously with the time when the rotational torque fluctuation generated by an internal combustion engine increases.

However, it is difficult to generate a counter load torque close synchronously with a torque fluctuation generated by the internal combustion engine. Namely, to cope with the requirement for detecting a torque fluctuation at high speed, it is necessary to calculate the value of the counter load torque necessary for canceling the torque fluctuation, and change the load torque by some available control means, and a series of processes detection, computation and control must be accelerated accordingly as an engine rotational speed increases; however this is rather unmanageable for the existing control techniques to implement.

SUMMARY OF THE INVENTION

An object of the invention is to provide an internal combustion engine equipped with a load torque controller for substantially preventing vibrations from arising due to a torque fluctuation of the internal combustion engine.

To attain the aforementioned object, the invention comprises an internal combustion engine provided with a main power transmission system and an accessory drive transmission system, wherein a torque fluctuation of the internal combustion engine is detected and a torque to be absorbed or generated by a motor generator is controlled according to torque fluctuation information of at least one engine cycle so as to decrease the torque fluctuation. Thus, the torque fluctuation at each crank angle can satisfactorily be minimized, and torsional vibration, vibration and noise of an engine support can also be suppressed.

Figure 7:
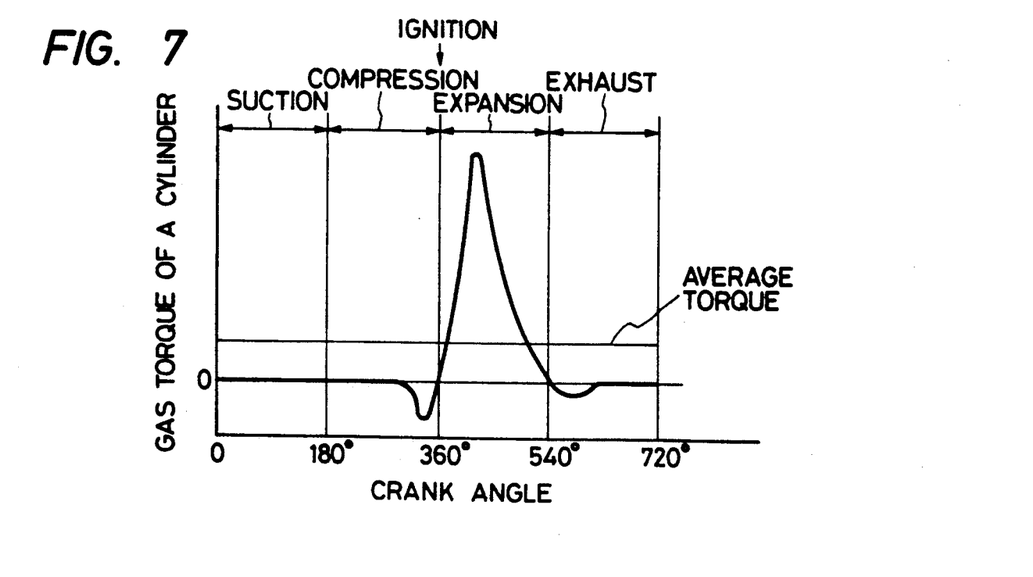
FIG. 7 is a graphical illustration of one example of a gas torque fluctuation of the internal combustion engine.
Figure 8:
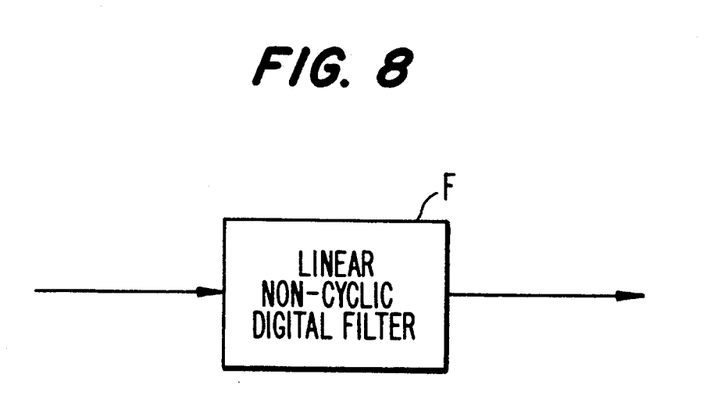
FIG. 8 is a schematic representation of an linear noncyclic digital filter.

One example of the curve of torque fluctuation generated by an internal combustion engine is illustrated in FIG. 7, which depicts a gas torque fluctuation of one cylinder of the internal combustion engine. That is, four strokes of suction, compression, expansion and exhaust correspond to 720° (2 revolutions) in terms of the crank angle in a four-stroke cycle engine (hereinafter referred to as an "engine cycle"), however, there arises an extremely large torque fluctuation on a combustion gas pressure immediately after ignition. In the case of four-cylinder engine, the same gas torque fluctuation occurs four times in one engine cycle 180° of crank shaft angle apart each other, and the summation of them is the gas torque fluctuation during one engine cycle. Then, adding an inertia torque fluctuation due to the fluctuation of rotational inertial force the torque fluctuation generated by an actual engine.

The torque fluctuation generated by an internal combustion engine changes sharply and complicatedly in dependence upon on the crank angle, therefore, it is difficult to change a load torque absorbed by accessories in response to the torque fluctuation on a real-time basis. However, when the running speed of an engine is constant, the torque fluctuation is regarded as a periodic pulsation phenomenon repeated with one engine cycle as one period. Accordingly, the value does not significantly change or vary with reference to the same crank angle.

On the other hand, the difference (residual torque) between the fluctuating torque and the load torque absorbed by the accessories and other components is reflected as a rotational speed variation to the crankshaft, and the rotational speed rises when the torque is increasing but drops as the torque decreases. Accordingly, if the crankshaft rotational speed variation is detected by some available means and the load torque is controlled so as to keep the rotational speed variation zero, then the residual torque will become zero and the problems of torsional vibration of each components due to the torque fluctuation and vibration and noise of a support member of the internal combustion engine due to the reaction of the torque fluctuation will be solved.

That is, in an internal combustion engine provided with a main power transmission system and an accessory drive transmission system, a crankshaft rotational speed variation due to the torque fluctuation is detected, a torque to be absorbed or generated by a motor generator which is necessary for keeping the rotational speed variation zero in each crank angle is calculated, and after one engine cycle the torque will be controlled according to the resultant controlled variable. For example, when the motor generator operates as a generator, the torque of absorption can be varied by varying an output current, and when motor genertor operates as a motor, the torque can be varied by varying a field current, thus the torque is able to be controlled.

DESCRIPTION OF THE PREFERRED EMBODIMENTS

Figure 1:
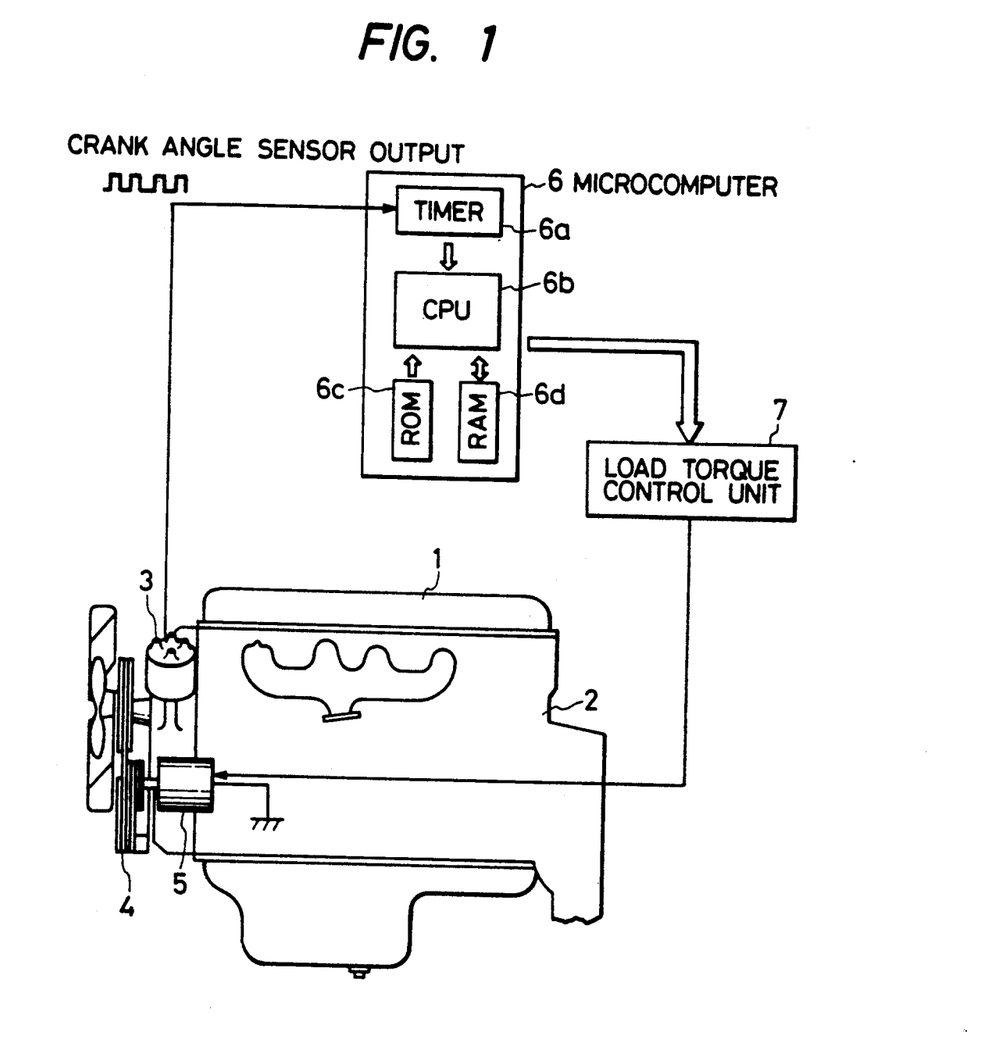
FIG. 1 is a schematic illustration of an internal combustion engine equipped with a torque control circuit in accordance with an embodiment of the present invention.

Referring now to the drawings wherein like reference numerals are used throughout the various views to designate light parts and, more particularly, to FIG. 1, according to this figure, distributor 3 incorporating a crank angle sensor therein, and a motor generator 5 driven by the engine through a V-belt 4 and mounted integrally with the engine unit 2. The motor generator 5 can be operated as a generator or a motor through changing the function accordingly. When the motor generator 5 is operated as a generator, a torque to be absorbed by the motor generator 5 can be varied by varying an output current of the generator, and when it is operated as a motor, a torque to be generated by the motor generator can be varied likewise by varying a field current of the motor.

A control system for controlling the torque to be absorbed or generated by the motor generator 5 includes a microcomputer 6 and a load torque control unit 7 for changing the function of the motor generator 5 either to a generator or to a motor on the command given thereby and thus varying output current or field current. To detect a torque fluctuation of the internal combustion engine 1 in terms of rotational speed variation, the microcomputer 6 computes the value of rotational speed variation every moment by clocking a crank angle sensor output pulse width (FIG. 2), calculates the crank angle to change the function of the motor generator 5 necessary for keeping the rotational speed variation value zero, and calculates the magnitude of the output current or the field current of the motor generator, and thus issues a command value to the load torque control unit 7 after one engine cycle.

Figure 2:
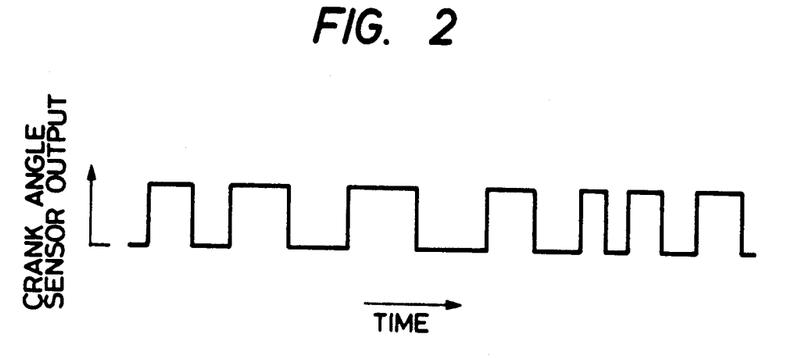
FIG. 2 is an illustration of a speed detection signal of a crank angle sensor.
Figure 3:
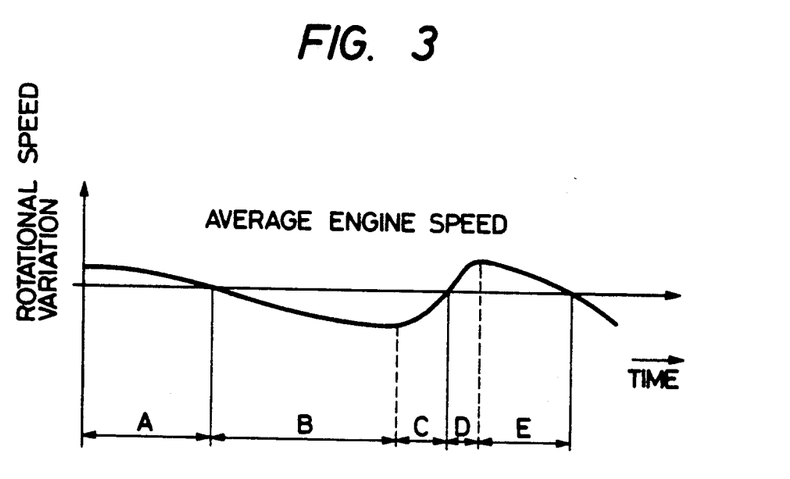
FIG. 3 is an illustration of a rotational speed variation corresponding to the signal shown in FIG. 2.

As shown in FIG. 2, when the crankshaft makes a rotational speed variation, the output pulse width varies. The microcomputer 6 measures a pulse width of the pulse on a timer 6a, determines a rotational speed every moment on CPU 6b from the inverse member of the timer, and then obtains an average rotational speed of the engine through an engine cycle period by counting a pulse equivalent to one engine cycle on a counter incorporated in the timer 6a. Then, the rotational speed for every moment is obtained through a deviation between the two as shown in FIG. 3.

Figure 4:
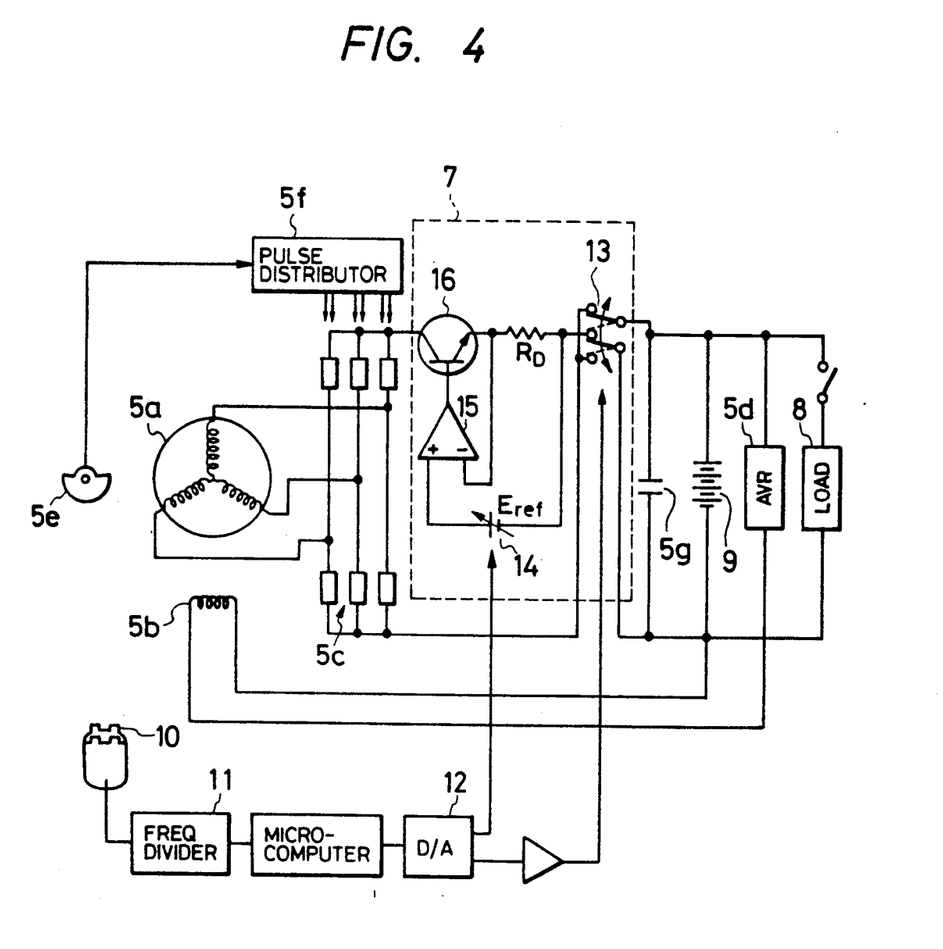
FIG. 4 is a circuit diagram of a torque controller.

FIG. 4 illustrates a construction of the control circuit for further detailed description of the action with reference to the first embodiment of the invention. The motor generator 5 comprises a stator winding 5a generating AC power (three-phase output in FIG. 4) at the time of operation as a generator and carrying a field current at the time of operation as a motor, a rotor winding 5b carrying an armature current, a rectifier 5c includes a switching element such as for example thyristor or the like, for converting the obtained alternating current into a direct current at the time of operation as a generator and distributing and feeding the field current to the stator winding 5a at the time of operation as a motor, and an automatic voltage regulator (AVR) 5d for regulating an output voltage constant. Additionally, a magnetic pole position sensor 5e is provided for detecting a relative position of the rotor winding 5b and a field pole as well as a pulse distributor 5f for distributing output signals of the magnetic pole position sensor 5e to each switching element in the rectifier 5c, and a condenser 5g for storing an output current from the generator at the time of operation as a generator and feeding the field current to the motor at the time of operation as a motor.

When a rotational speed of the internal combustion engine 1 is high and a torque fluctuation generated by the engine 1 is small and there is no requirement for torque control, the motor generator 5 operates as a generator in the following manner. When a magnetic field of the rotor winding 5b rotates, the stator winding 5a generates electric power and feeds electric power to a load 8 such as ignition coil, light or the like and a battery 9 by way of the rectifier 5c.

When a rotational speed of the internal combustion engine 1 is low and a torque generated by the engine sharply fluctuates, the torque fluctuation is reflected as a rotational speed variation of the crankshaft, which is detected by a crank angle sensor 10. The detected rotation pulse is divided by a frequency divider 11 into a pulse number necessary for control, and is then supplied to the microcomputer 6, and thus the rotational speed variation is computed according to the method mentioned hereinabove. The microcomputer 6 further computes a value of output current in the case of the motor generator 5 operating as a generator or field current in the case of operating as a motor from the rotational speed variation, and the result is supplied together with a generator-motor function change signal, which is sent to the load torque control unit 7 through a D/A convert 12. When an operation of the motor generator 5 is changed to a generator or a motor (full line indicating a motor; broken like indicating a generator), a function change switch 13 of the load torque control unit 7 is actuated on a command from the microcomputer 6, and thus an electrical polarity between the stator winding 5a and condenser 5g of the motor generator 5 and the battery 9 is inverted accordingly. For setting a magnitude of the output current or the field current of the motor generator 5 at $E_{ref}/R_D$, a value obtained through dividing a reference voltage ($E_{ref}$) 14 by a resistance $R_D$, a negative feedback is applied on a comparison amplifier 15 so as to equalize the reference voltage $E_{ref}$ with a voltage drop at the resistance $R_D$. Accordingly, with the reference voltage $E_{ref}$ kept variable, if the value is increased, the output current or the field current gets larger, but if $E_{ref}$ is decreased, the current gets smaller.

That is, a command of the output current or the field current output from the microcomputer 6 is converted into a voltage by D/A converter 12, and using the voltage as a reference voltage, the current can be varied. Then, when an actual rotational speed is greater than the average rotational speed (sections A, D, E in FIG. 2), the motor generator 5 is operated as a generator, and when the rotational speed increases (section D in FIG. 2), the reference voltage $E_{ref}$ is intensified to increase the output current. However, thereby increasing an absorption torque, when the rotational speed decreases (sections A, E in FIG. 2), the reference voltage is minimized to decrease the output current, thereby decreasing the absorption torque, then when an actual rotational speed is smaller than the average rotational speed (sections B, C in FIG. 2), the motor generator 5 is operated as a motor, and when the rotational speed decreases (section B in FIG. 2), the reference voltage $E_{ref}$ is intensified to increase the field current, thereby increasing a generated torque. When the rotational speed increases (section C in FIG. 2) the reference voltage is minimized to decrease the field current, thereby decreasing the generated torque, then the torque absorbed or generated by the motor generator 5 functions to cancel a fluctuation of the torque generated by the internal combustion engine unit 2, and thus the entire torque fluctuation of internal combustion engine 1 can be suppressed.

Figure 5:
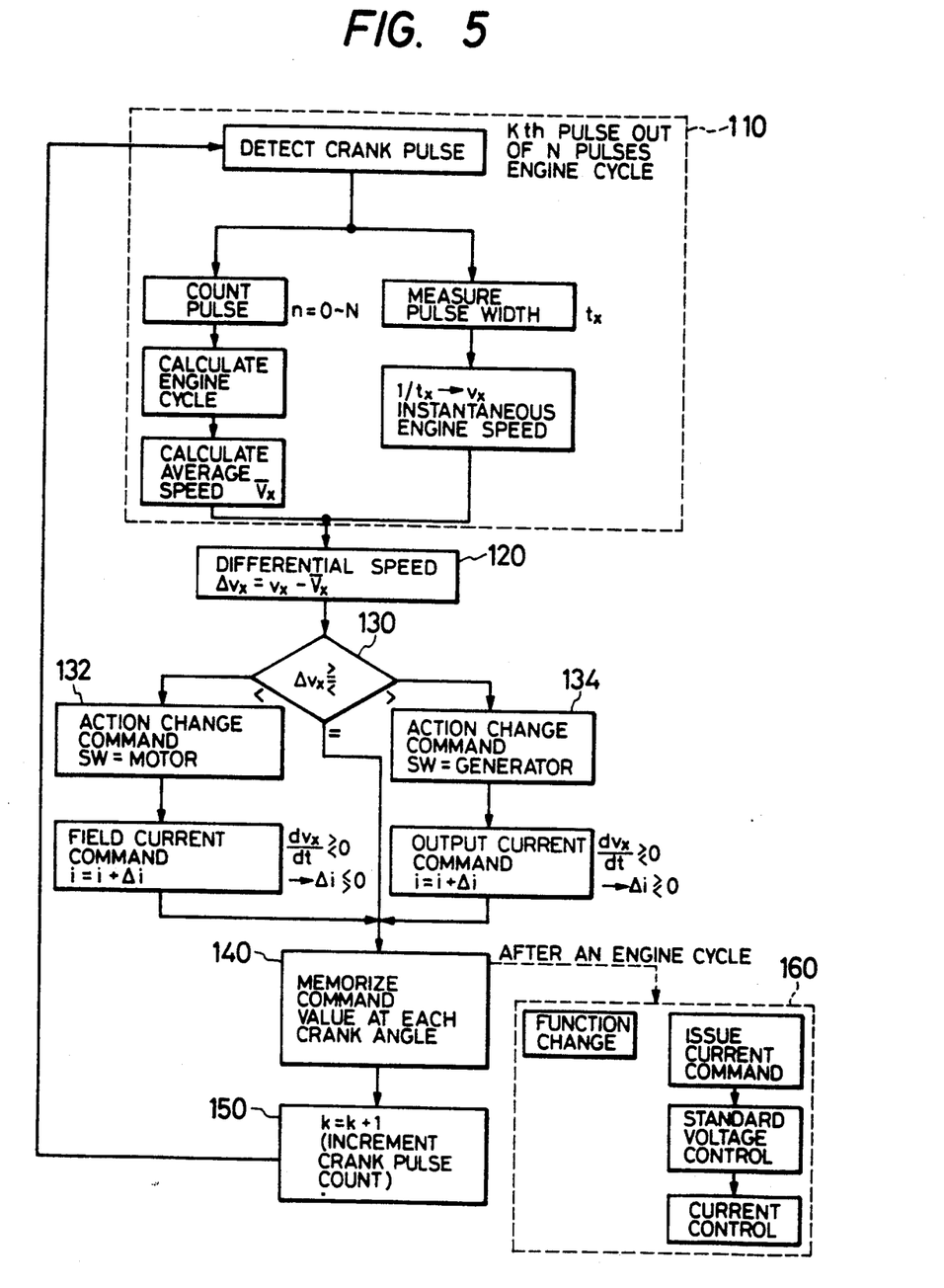
FIG. 5 is a drawing illustrating a control flow of the torque controller.

FIG. 5 illustrates a control flow of the control circuit described as above. First in STEP 110, if a pulse number during one engine cycle is N, when the rotation pulse (k-th) in a crank angle is detected, a pulse width $t_x$ with the k−1-th pulse is determined, a rotational speed $v_x$ at the angle is calculated therefrom, pulses coming in (k−N) to (k−1)th are counted, and thus an average rotational speed $\bar{V}_x$ in the preceding one engine cycle is calculated from for half time period. Then, in STEP 120, a differential speed $\Delta v_x = v_x - \bar{V}_x$ between the two is computed.

Next, In STEP 130, a magnitude of the differential speed $\Delta v_x$ is discriminated, and when the k-th rotational speed $v_x <$ average rotational speed $\bar{V}_x$, or the differential speed $\Delta v_x < 0$, a function change command is switched to MOTOR in STEP 132. Where $v_x$ has increased ($dv_x/d_t > 0$), a value $i + \Delta i$ for which a field current increment $\Delta j$ having a negative value is added to the present field current is intended as a field current command value, but where $V_x$ has decreased ($dv_x/d_t > 0$), a value $i + \Delta i$ for which the field current increment $\Delta i$ having a positive value is added to the present field current is intended as the field current command value to shift to STEP 140.

When the k-th rotational speed $v_x >$ the average rotational speed $\bar{V}_x$, or the differential speed $\Delta v_x > 0$, the function change command is switched to GENERATOR in STEP 134, and where $v_x$ has increased, the value $i + \Delta i$ for which an output current increment $\Delta i$ having a positive value is then added to the present output current is intended as an output current command value, but when $v_x$ has decreased, the value $i + \Delta i$ for which the output current increment $\Delta i$ having a negative value is added to the present output current is intended as the output current command value, thus shifting to STEP 140. Further, when the k-th engine speed $v_x = \bar{V}_x$, STEP 140 ensues with the current command value as renewed.

In STEP 140, a k-th load current command value $i_s$ is stored, a pulse count is updated to a (k+1)th crank angle in STEP 150, thus returning to the start.

In STEP 160, function change command at each stored crank angle and field or outputted current command are output after one engine cycle, the function change switch 13 is actuated by the function change command, an operation of the motor generator 5 is changed to GENERATOR or MOTOR accordingly, and a magnitude of the reference voltage $E_{ref}$ is controlled on the current command, thus completing a control of the output current of the field current.

Then, in the above description, the function change command is decided according to the sign (+ or −) of $\Delta v_x$ at every engine cycle, however, in case the crank angle with the sign $\Delta v_x$ changing can be regarded almost constant, the function change command at each crank angle may be decided beforehand. Then, in case, likewise, where $v_x$ increases or decreases and the crank angle can be regarded almost constant, the sign of the current increment $\Delta i$ at each crank angle may be decided beforehand.

Figure 6:
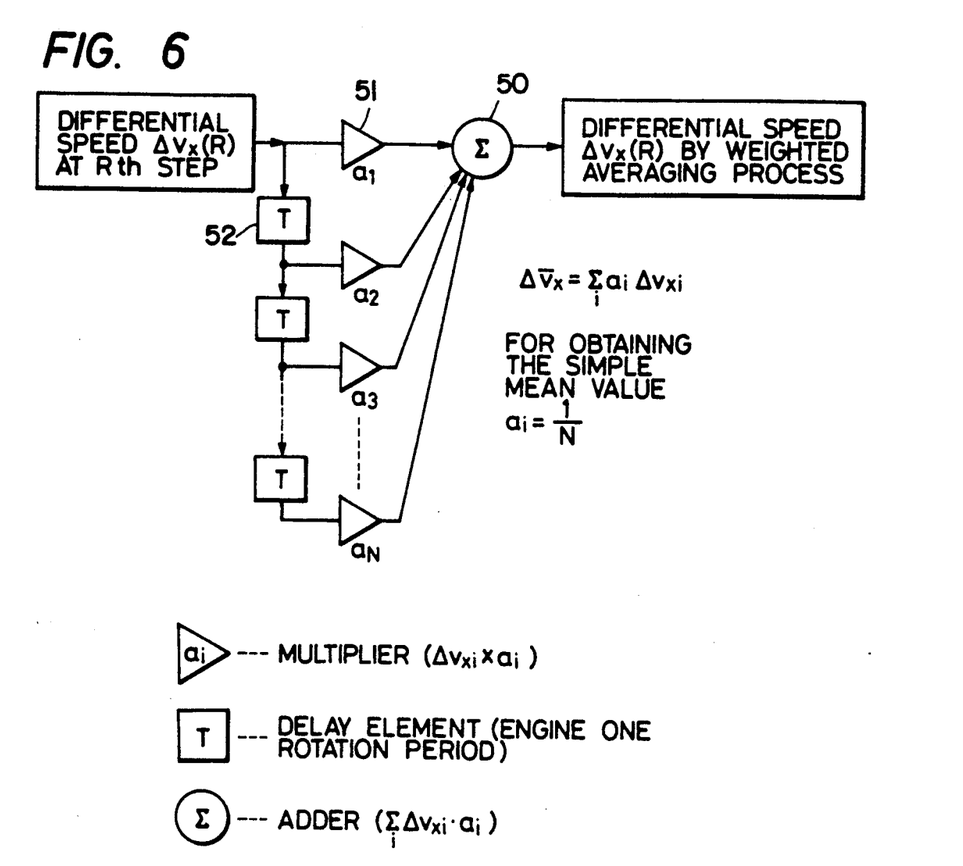
FIG. 6 is a flow diagram of a digital filter used when averaged data is employed.

FIG. 6 shows a method wherein information for several engine cycles prior to the present is stored as rotational speed variation information for control, subjected to an averaging process and thus a controlled variable is determined from the data thereof.

Now, differential speed data $\Delta v_x(k)$ at a crank angle position k is weighted and averaged for several engine cycles in the past as:

$$\Delta v_x(k) = \sum_{i=0}^{n} a_i \cdot \Delta v_x(k)i \qquad (1)$$

and such averaging process is obtainable by using a linear non-cyclic digital filter generally designated by the reference character shown in FIG. 6. In Eq. (1), $a_i$ denotes a weighting coefficient. It comprises an adder 50, a multiplier 51 and a one-delay element (one engine cycle) 52 to the input data $\Delta v_x$. Here, if $a_i = a_2 \ldots = a_n = 1/n$, then Eq. (1) will be for obtaining a simple mean value.

In such method available by averaging process, since a rotational speed variation of the crankshaft is periodic, any fluctuation component which may arise does not adversely affect controllability, and a governing component of the torque fluctuation can securely be controlled, therefore a control with better reliability will be realizable.

As described above, according to the invention, a torque fluctuation generated by an internal combustion engine is detected, and a torque absorbed or generated by a motor generator is controlled so as to decrease the torque fluctuation; therefore, the torque fluctuation transferred to a main power transmission system can be decreased, and vibrations transferred to an engine support can also be minimized. Accordingly, an excessive torsional vibration will not arise on the main power transmission system, reliability and performance can be enhanced, and further noise arising from the engine support and other components can be decreased.

We claim:

1. An internal combustion engine comprising:
  a main transmission means;
  at least one accessory means in the form of a motor generator means adapted to function as one of a motor and a generator;
  an accessory drive transmission means for driving said at least one accessory means;
  a load torque controller means, including detection means for detecting a rotational speed variation at each crank angle of the internal combustion engine, for outputting a generator motor function change signal for causing said motor generator means to function as one of said motor and said generator, said rotational speed variation being a differential between an average torque generated by the internal combustion engine over an engine cycle of said internal combustion engine and an instantaneous torque generated by said internal combustion engine at said each crank angle; and control means, responsive to said generator motor function change signal and said rotational speed variation detected by said detection means, for controlling a torque to be one of generated and absorbed by said motor generator means to decrease the rotational speed variation of the internal combustion engine at each crank angle.

2. The internal combustion engine according to claim 1, wherein the motor generator means is operated as a generator to absorb a torque when the engine speed is greater than an average engine speed, and operated as a motor to generate a torque when the engine speed is smaller than an average engine speed.

3. The internal combustion engine according to claim 1, wherein the motor generator means is operated as a generator and an output current is simultaneously increased to increase an absorption torque when an engine speed is greater than an average engine speed and is increasing and said output current is simultaneously decreased to decrease the absorption torque when the engine speed is less than an average engine speed and is decreasing, and wherein when the motor generator means is operated as a motor a field current is simultaneously increased to increase a generated torque when the engine speed is smaller than an average engine speed and decreasing, and the field current is decreased to decrease the generated torque when the engine speed is increasing.

4. The internal combustion engine according to one of claim 1, 2 or 3, further comprising a condenser means for storing an output current of a generator when the motor generator means operates as a generator and for feeding a field current of a motor when said generator means operates as a motor.

5. An internal combustion engine equipped with a load torque controller, comprising:

a motor generator means driven by the internal combustion engine and operable as a motor and a generator; and a control means for controlling a torque generated or absorbed by the motor generator means, said control means comprising a detecting means for detecting each rotation angle of a crank shaft of said internal combustion engine, a detecting means for detecting a rotational speed variation whereby a torque fluctuation generated by the internal combustion engine is obtainable as a difference between an actual engine speed at each crank angle of the internal combustion engine and an average rotational speed in one engine cycle, a function change means for changing said motor generator means to a motor and a generator according to detected rotational speed variation information in at least one preceding engine cycle, and wherein said function change means operates said motor generator means as a generator when said engine speed is greater than the average engine speed but operates the motor generator means as a motor when the engine speed is smaller than the average engine speed.

* * * * *